(12) United States Patent
Seol et al.

(10) Patent No.: US 12,545,799 B2
(45) Date of Patent: Feb. 10, 2026

(54) CATALYST INK FOR PLATING AND ELECTROLESS PLATING METHOD USING SAME

(71) Applicant: KOREA ELECTROTECHNOLOGY RESEARCH INSTITUTE, Changwon (KR)

(72) Inventors: Seung Kwon Seol, Namyangju (KR); Sang Hyeon Lee, Gangneung (KR); Won Suk Chang, Seoul (KR); Jae Yeon Pyo, Changwon (KR)

(73) Assignee: KOREA ELECTROTECHNOLOGY RESEARCH INSTITUTE, Changwon (KR)

( * ) Notice: Subject to any disclaimer, the term of this patent is extended or adjusted under 35 U.S.C. 154(b) by 0 days.

(21) Appl. No.: 18/770,498

(22) Filed: Jul. 11, 2024

(65) Prior Publication Data

US 2024/0360331 A1 Oct. 31, 2024

Related U.S. Application Data

(62) Division of application No. 17/279,527, filed as application No. PCT/KR2018/012831 on Oct. 26, 2018, now abandoned.

(30) Foreign Application Priority Data

Sep. 27, 2018 (KR) ........................ 10-2018-0114732

(51) Int. Cl.
    *C09D 11/52* (2014.01)
    *C09D 11/033* (2014.01)
    (Continued)

(52) U.S. Cl.
    CPC ............ *C09D 11/52* (2013.01); *C09D 11/033* (2013.01); *C09D 11/037* (2013.01); *C09D 11/14* (2013.01);
    (Continued)

(58) Field of Classification Search
    CPC .............................. C09D 11/52; C09D 11/033
    See application file for complete search history.

(56) References Cited

U.S. PATENT DOCUMENTS

| 2010/0075026 A1* | 3/2010 | Sung | ............... H05K 3/182 |
|---|---|---|---|
| | | | 524/440 |
| 2012/0192758 A1* | 8/2012 | Imori | ............... C23C 18/2066 |
| | | | 427/304 |

(Continued)

FOREIGN PATENT DOCUMENTS

| CN | 107365529 A | * 11/2017 | ............. C09D 11/52 |
|---|---|---|---|
| JP | 2004-277688 | 10/2004 | |

(Continued)

OTHER PUBLICATIONS

Li et al. Modification of inkjet printer for polymer sensitive layer preparation on silicon-based gas sensors. AIP Advances. vol. 5, 2015 (Year: 2015).*

*Primary Examiner* — Cachet I Proctor (57) ABSTRACT

A catalyst ink for plating and a method for electrochemically manufacturing an electronic device by using same are disclosed. The present invention provides a catalyst ink for plating, comprising: a polymer binder; a metal ion as a catalyst; a silane coupling agent for coupling the metal ion and the polymer; and a solvent, wherein the polymer has a lower critical solution temperature in the temperature-composition phase diagram for a solvent-polymer binary system, and the lower critical solution temperature is 30° C. or higher. According to the present invention, a high resolution plated pattern having a line width and a width between lines can be manufactured.

8 Claims, 9 Drawing Sheets

(51) Int. Cl.
- *C09D 11/037* (2014.01)
- *C09D 11/14* (2006.01)
- *C09D 11/322* (2014.01)
- *C09D 11/38* (2014.01)
- *C23C 18/16* (2006.01)
- *C23C 18/20* (2006.01)
- *H05K 3/18* (2006.01)

(52) U.S. Cl.
CPC ............ *C09D 11/322* (2013.01); *C09D 11/38* (2013.01); *C23C 18/1608* (2013.01); *C23C 18/161* (2013.01); *C23C 18/2066* (2013.01); *H05K 3/182* (2013.01)

(56) References Cited

U.S. PATENT DOCUMENTS

| | | | |
|---|---|---|---|
| 2013/0295287 A1 | 11/2013 | Tsukamoto | |
| 2015/0240101 A1* | 8/2015 | Chopra | C09D 11/037 252/514 |

FOREIGN PATENT DOCUMENTS

| | | | |
|---|---|---|---|
| JP | 2016-194150 | 11/2016 | |
| JP | 2017-210630 | 11/2017 | |
| JP | 2017210630 A * | 11/2017 | ............ C23C 18/30 |
| KR | 10-2010-0134792 | 12/2010 | |
| KR | 10-2012-0120155 | 11/2012 | |
| KR | 10-2014-0027920 | 3/2014 | |
| KR | 10-2014-0050534 A | 4/2014 | |

\* cited by examiner

FIG. 9

CATALYST INK FOR PLATING AND ELECTROLESS PLATING METHOD USING SAME

CROSS-REFERENCE TO RELATED APPLICATION

This application is a division of U.S. patent application Ser. No. 17/279,527, filed Mar. 24, 2021, which is a national stage application, filed under 35 U.S.C. § 371, of International Patent Application No. PCT/KR2018/012831, filed on Oct. 26, 2018, which claims the priority to Korean application No. 10-2018-0114732, filed Sep. 27, 2018, which is incorporated by reference herein in its entirety.

TECHNICAL FIELD

The present invention relates to a catalyst ink for plating and a method for electrochemically manufacturing an electronic device by using same, and more particularly, to a method for manufacturing an electronic device by using a catalyst ink for plating.

BACKGROUND ART

Printed electronics have advantages in that a process can be simplified and a rapid and inexpensive circuit device can be manufactured on various substrates by directly printing a desired shape, compared to a complicated and expensive photolithography technique in the related art.

Typically, printed electronics manufacture a wiring pattern in the form of directly printing a two-dimensional wiring pattern with a pattern-forming material, for example, a paste including a conductive metal such as Cu However, the wiring pattern manufactured by these printed electronics has a problem in that the wiring pattern shows a high resistance value.

Due to such a problem, there has been an attempt to apply an electrochemical plating method capable of obtaining a high-quality conductive film for forming a pattern of an electronic device or wiring. The plating method has an advantage in that it is possible to obtain a high-quality conductive film, but the formation of a precursor pattern such as a seed for electroplating or a catalyst for electroless plating on a base material needs to be preceded. These precursor patterns need to be able to implement high adhesion to a base material and a high resolution line width. However, there remains a problem in that it is difficult to implement a high resolution wiring pattern having a line width and a width between lines while having high adhesion with an ink for plating and printed electronics in the related art.

DISCLOSURE

Technical Problem

As a result of studies on printed electronics and electrochemical plating technique, the present inventors have found that obtaining a metal plated film having high adhesion to a base material and a fine pattern having a uniform line width is closely related to thermodynamic and/or dynamic characteristics of a catalyst ink for plating.

Thus, an object of the present invention is to provide a catalyst ink for plating capable of forming a high resolution precursor pattern having a line width and a width between lines while having high adhesion to a base material.

Another object of the present invention is to provide a precursor pattern having thermodynamic stability in a plating tank environment and furthermore to finally provide a catalyst ink for plating capable of forming a plated pattern having a uniform line width. Still another object of the present invention is to provide a method for manufacturing a high resolution wiring pattern having a line width and a width between lines, which is uniform and fine by using the above-described catalyst ink for plating.

Technical Solution

To achieve the technical objects, the present invention provides a catalyst ink for plating, comprising: a polymer binder; a metal ion as a catalyst; a coupling agent for coupling the metal ion and the polymer; and a solvent, wherein the polymer has a lower critical solution temperature in the temperature-composition phase diagram for a solvent-polymer binary system, and the lower critical solution temperature is 30° C. or higher.

In the present invention, the lower critical solution temperature may be about 50° C. or more, about 55° C. or more, about 60° C. or more, and about 65° C. or more.

Further, in the present invention, the solvent may be water, alcohol, or acetone.

In addition, in the present invention, it is preferred that the polymer includes an OH functional group. In this case, the polymer may include at least one selected from the group consisting of hydroxypropyl cellulose, methyl cellulose, hydroxypropylmethyl cellulose, ethyl(hydroxyethyl)cellulose, poly(N-isopropylacrylamide-co-acrylic acid) and poly (propylene glycol).

In the present invention, the metal of the metal ion may be at least one selected from the group consisting of Ag, Fe, Co, Ni, Cu, Pd, Pt, Sn, and Au.

In the present invention, it is preferred that the ink has a viscosity of 5 mPa·s to 1,500 mPa·s.

Furthermore, it is preferred that the ink has a loss modulus higher than a storage modulus, and it is more preferred that the ink has a loss modulus/storage modulus ratio of 101 or more.

Further, the present invention provides a plating method, comprising: providing a base material in which a precursor pattern is formed by ejecting a catalyst ink for plating, comprising a polymer binder, a metal ion as a catalyst, and a solvent; and immersing the base material in which the precursor pattern is formed in a plating solution which is maintained at a temperature equal to or higher than a lower critical solution temperature in the temperature-composition phase diagram for a solvent-polymer binary system and forming a plated pattern through electroless plating.

In the present invention, the precursor pattern may be formed by a method of ejecting the catalyst ink for plating without pressure through a nozzle.

Advantageous Effects

According to the present invention, it is possible to form a high resolution precursor pattern having a line width and a width between lines while having high adhesion, and to provide a precursor pattern having thermodynamic stability in a plating tank environment. Further, the present invention can finally provide a metal plated pattern having a uniform line width, and this pattern can be used for manufacturing wiring or an electronic device.

BEST MODE

Hereinafter, the present invention will be described in detail by explaining preferred exemplary embodiments of the present invention.

In the present invention, a catalyst ink for plating includes a metal as a catalyst, a polymer as a binder, a coupling agent for coupling the metal and the polymer, and a solvent.

In the present invention, the metal includes at least one metal selected from the group consisting of Ag, Fe, Co, Ni, Cu, Pd, Pt, Sn, and Au. Since the catalyst is preferably present in the form of ions in an ink composition of the present invention, it is preferred that the metal in the ink is provided as a metal salt.

Further, in the present invention, the polymer provides adhesion to the base material. It is preferred that the polymer required in the present invention includes an OH group at the end. In addition, in the present invention, the polymer is required to have predetermined thermodynamic characteristics, which will be separately described below.

Furthermore, in the present invention, the coupling agent couples a polymer with a metal salt. For example, a silane coupling agent may be used as the coupling agent, and examples thereof include 3-aminopropyl trimethoxysilane (APTMS), 3-aminopropyl triethoxysilane (APTES), 3-aminopropyldimethylethoxysilane (APDMES), and the like.

Figure 1:
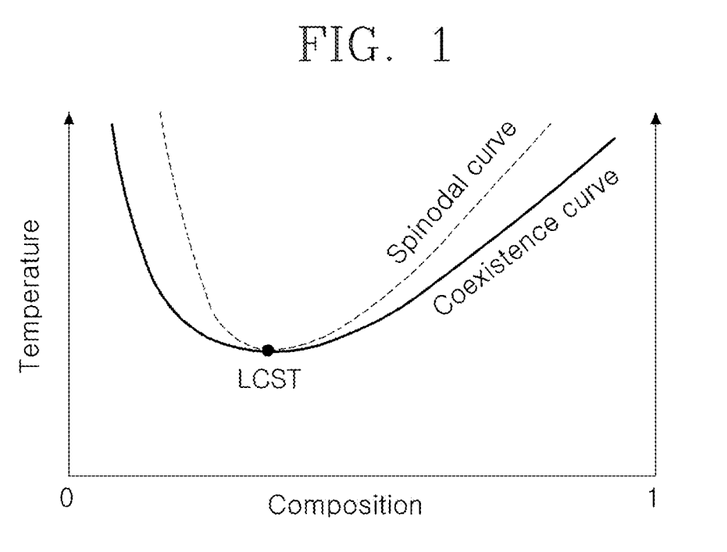
FIG. 1 is a view schematically illustrating the pattern forming mechanisms of a catalyst ink for plating of the present invention.

FIG. 1 is a view schematically illustrating the pattern forming mechanisms of a catalyst ink for plating of the present invention.

As illustrated, for example, a silanization reaction in which a silane coupling agent is bound to a terminal OH group on a polymer such as hydroxypropyl cellulose (HPC) is performed, and a metal salt is bound to an amino group on a surface formed, so that a metal ion complex is formed.

Figure 2:
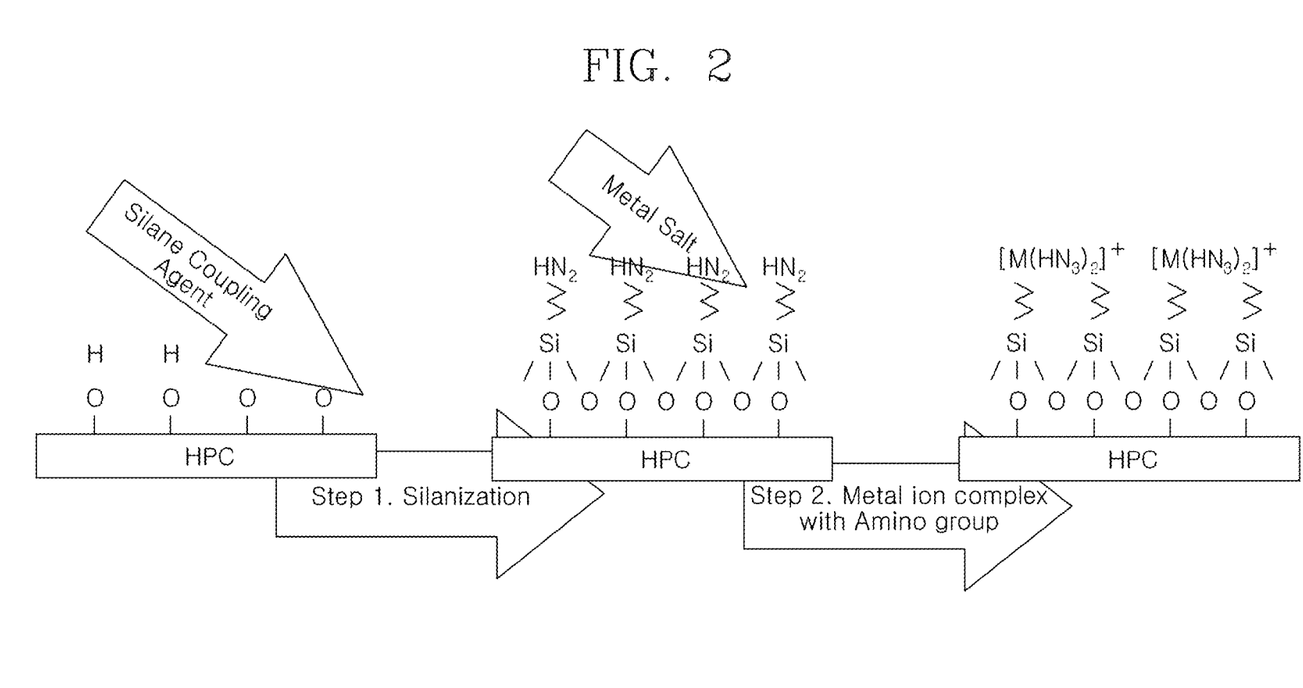
FIG. 2 is a schematic phase diagram for an exemplary polymer-solvent system as the catalyst ink for plating of the present invention.

FIG. 2 is a phase diagram of a polymer-solvent system for explaining the thermodynamic characteristics required for the catalyst ink for plating of the present invention.

In the present invention, a mixture of the polymer and the solvent constituting the catalyst ink for plating shows a change in phase depending on the composition-temperature. Preferably, it is stable that the mixture forms a completely solid solution state of a liquid phase at a temperature which is equal to and less than a predetermined temperature, and the temperature is referred to as a lower critical solution temperature (LCST). In contrast, when the composition-temperature coordinates of the mixture on the phase diagram are located inside the spinodal curve passing the lower critical solution temperature, the mixture is separated into two phases, that is, the polymer or a phase derived therefrom is precipitated from the solvent. When the composition-temperature coordinates of the mixture are located between the spinodal curve and the coexistence curve on the phase diagram, a partial separation of the phase occurs, and the partial separation of the phase can be called a metastable state.

The characteristics of such a polymer-solvent mixture may provide the following preferred advantages in the present invention. At the temperature of the preparation and storage conditions of ink (for example, room temperature), the mixture is stable as a solid solution state of the liquid phase, so that the polymer may be uniformly dispersed in the solvent.

In contrast, when the plating conditions are maintained at a higher temperature, for example, a relatively high temperature equal to and higher than the LCST temperature, a printed precursor pattern immersed in a plating tank does not deteriorate even when exposed to the plating solution (for example, a solvent such as water). In this case, this is because it is thermodynamically stable for the polymer forming the precursor pattern to be separated from the solvent.

Since such ink characteristics do not dissolve or decompose the precursor pattern in the plating solution, the precursor pattern makes the plated film firmly bound to the base material. Further, the line width of the precursor pattern formed by the ink for plating may be maintained as it is even in the plating solution, and the uniformly printed line width may be maintained throughout the plating process.

The polymer and the solvent which constitute the ink for plating of the present invention have a relationship on the phase diagram exhibited by the above-described polymer-solvent. Preferably, the polymer and the solvent, which are used in the ink for plating, have a lower critical solution temperature (LCST) in the temperature-composition phase diagram of the polymer-solvent system, and the lower critical solution temperature is about 30° C. or higher, 35° C. or higher, 40° C. or higher, 45° C. or higher, 50° C. or higher, 55° C. or higher, 60° C. or higher, and 65° C. or higher.

In the present invention, the preferred polymer-solvent system and LCST values are shown in Table 1.

TABLE 1

| Classification | Polymer | Solvent | LCST |
| --- | --- | --- | --- |
| 1 | Hydroxypropyl cellulose | Water | 45° C. |
| 2 | Methyl cellulose | Water | 50° C. |
| 3 | Hydroxypropylmethyle cellulose | Water | 70° C. |
| 4 | Ethyl(hydroxyethyl)cellulose | Water | 65° C. |
| 5 | Poly(N-isopropylacrylamide-co-acrylic acid) | Water | 32 to 36° C. |
| 6 | Poly(propylene glycol) | Water | 50° C. |

In the present invention, the plating working conditions regarding the polymer, solvent content and composition of the ink for plating may be designed by reflecting the following items.

For example, when hydroxypropyl cellulose (HPC) in Table 1 is used as a polymer, the LCST is approximately 45° C. By the way, the spinodal curve corresponding to the polymer-solvent composition has a downwardly convex shape, the LCST is set as a base point, and the corresponding temperature value is increased as the composition is changed based on the LCST. Therefore, in the actual polymer-solvent composition in the ink, the polymer may remain co-dissolved in the solvent even at a temperature higher than the LCST. Therefore, in order to suppress the dissolution of the printed precursor pattern, it is preferred to perform plating at a temperature equal to or higher than the temperature of the spinodal curve corresponding to the composition, for example, 60° C. or higher.

Meanwhile, in the present invention, the ink for plating may be designed to have the required flow characteristics.

Examples of printed electronics using ink include various methods such as the use of a high-viscosity ink paste, such as screen printing, gravure, and offset printing, the use of a pressure injection method such as inkjet with a slightly low-viscosity ink paste, and a so-called meniscus guided printing method that does not use any other external force other than the self-weight and surface tension to eject ink.

When an external force acts on the ejection of ink, the ink discharged from the nozzle collides with the base material, so that the bleeding of the ink is inevitable, and due to the bleeding of the ink, a pattern having a line width larger than an intended line width is formed. In contrast, the meniscus guided printing method is a method in which the ink inside the nozzle is discharged by the surface tension of the ink ejected outside the nozzle, so that it is possible to form a pattern equal to or smaller than the nozzle diameter by changing the moving speed of the nozzle. Hereinafter, a method for forming a pattern in the meniscus guided printing method will be described with reference to FIGS. 3A to 3C.

Figure 3A:
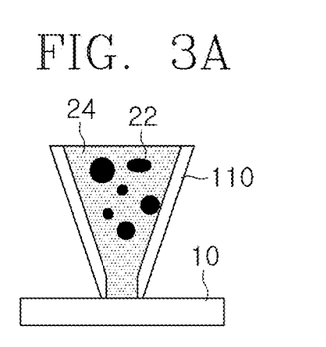
FIGS. 3A to 3C are a set of views for schematically explaining a meniscus-guided printing technique of the present invention.
Figure 3B:
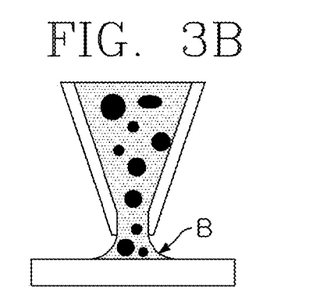
Figure 3C:
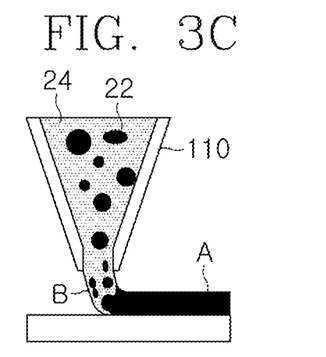

FIGS. 3A to 3C are a set of views for schematically explaining a meniscus-guided printing technique of the present invention.

Referring to FIG. 3A to 3C, an ink for plating for a precursor pattern having a high surface tension is maintained in a printing pen 110 provided with a nozzle. The ink can include dispersed particles 22 including a metal ion, a polymer and the like, and a solvent 24.

As the printing pen 110 is brought into contact with a substrate 10 (FIG. 3A) and the pen 110 moves from the contact point in a specific direction, for example, in a direction perpendicular to the substrate by a predetermined distance, the ink is released to the nozzle at the tip of the pen at a predetermined flow rate (W) (FIG. 3B). A meniscus (B) is formed by the surface tension of the ink released from the vicinity of the nozzle at the tip of the pen. Subsequently, when the pen moves in a direction parallel to the substrate at a predetermined speed, the solvent of the ink is instantaneously evaporated from the surface of the meniscus, and as a result, a precursor pattern (A) is formed on the substrate. When the printing pen 110 is moved, the surface tension of the meniscus (B) formed at the tip of the nozzle acts in a direction of minimizing the surface area of the ink, and the ink in the nozzle is pulled to release the ink to the outside of the nozzle without interruption. As a result, a precursor pattern corresponding to the movement locus of the nozzle may be printed on the substrate. In order to eject the ink during this process, no other external energy is applied other than the self-weight of the ink.

In this method, the width of the meniscus depends on the diameter of the nozzle and the moving speed of the nozzle. In addition, since the particles in the ink are guided and flow in the meniscus that acts like a pipeline, the line width of the resulting print pattern may have a value equal to or smaller than the width (d) of the meniscus.

In the meniscus guided printing method, the flow characteristics of the ink need to be controlled to eject ink without interruption. A considerable amount of binder and coupling agent may be used to provide sufficient bonding force between the printed precursor pattern and the base material (substrate), and the ink exhibits viscoelastic behavior in which the viscosity of the ink is changed depending on an external force. In this case, in the present invention, it is preferred that the ink for plating exhibits a liquid-like behavior within an appropriate stress range. For example, it is preferred that the ink for plating has a storage modulus value lower than the loss modulus under a shear stress of $10^1$ to $10^3$ Pa. More preferably, it is preferred that the ratio of storage modulus/loss modulus in the above-described shear stress range is $10^1$ or more.

In the present invention, it is preferred that the catalyst ink for plating has a viscosity of 5 to 1,500 mPa·s. An ink having a low viscosity exhibit good flow characteristics, but a low catalyst concentration makes efficient plating difficult. Further, an increase in the viscosity of the ink may increase the catalyst concentration, but may cause a change in the flow characteristics of the ink.

In the present invention, the flow characteristics of the ink for plating may be controlled by the concentration of a metal ion, the concentration of a binder, and the concentration of a coupling agent. Preferably, in the present invention, it is preferred that the concentration of the metal ion, the concentration of the binder, and the concentration of the coupling agent are 1 to 15 g/L, 10 to 200 g/L, and 5 to 15 g/L, respectively.

MODE FOR INVENTION

Hereinafter, a method for forming a wiring pattern with the above-described ink for plating will be described.

Figure 4A:
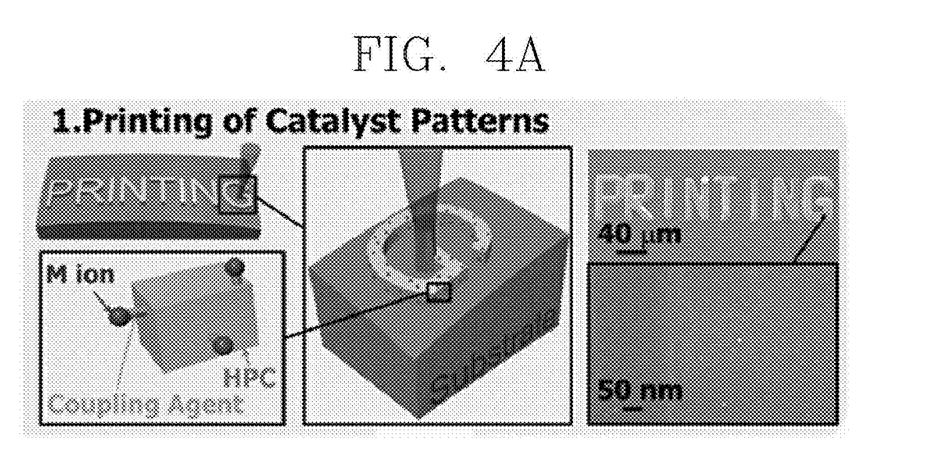
FIGS. 4A and 4B are a set of views for schematically explaining a method of forming a wiring pattern according to an example of the present invention.
Figure 4B:
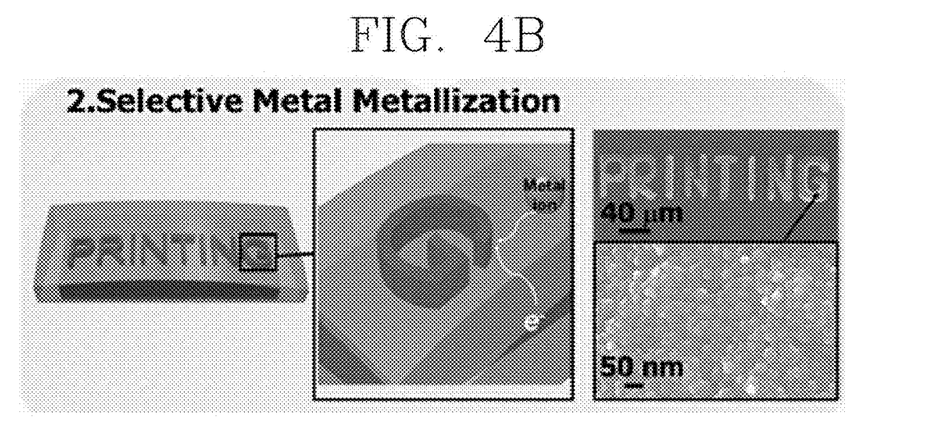

FIGS. 4A and 4B are a set of views for schematically explaining a method of forming a wiring pattern according to an example of the present invention.

Referring to FIG. 4A, a predetermined precursor pattern is formed on a base material (substrate) with the above-described catalyst ink for plating. In the present invention, the precursor pattern may be formed to be brought into contact with the base material, but may be formed on another pattern on the base material unlike the above formation of the precursor pattern.

In the illustrated drawing, the character pattern 'PRINTING' is illustrated. In this case, a meniscus guided printing technique may be used as the printing technique, but the present invention is not limited thereto, and a printing technique of a pressure ejection method such as an inkjet may be applied. In the printing method of the present invention, the implementable minimum line width of the precursor pattern is 1 μm. An implementable maximum line width is not particularly limited, and a line width of up to 300 μm can be implemented. FIG. 4 illustrates a pattern with a line width of 10 μm.

In the pattern printed on the surface of the substrate as illustrated in FIG. 4A, an HPC binder provides adhesive strength to a base material, a metal ion is exposed on the surface of the pattern, and the metal ion acts as a catalyst for electroless plating.

Next, as illustrated in FIG. 4B, a base material on which a precursor pattern is printed is immersed in a plating solution to electrolessly plate a metal. The plated metal is selectively plated on the surface of the pattern. The drawing on the right side of FIG. 4B is a photograph of the surface state of the plated film, and it can be confirmed that the plated film has a domain with a size of several tens of nm and the metal is plated.

In the present invention, the plating solution may be a solution containing various metals and metal alloys such as Cu, Ni, Ni—P, Ni—W—P, and Ni—W—Cu—P.

In the present invention, a polymer binder of the catalyst ink for plating exhibits the LCST behavior in the plating solution. Therefore, the temperature of the plating solution is maintained at the LOST or higher. Preferably, the temperature of the plating solution is adjusted to be located above the spinodal curve on the composition-temperature phase diagram of the polymer-solvent system. Accordingly, the polymer binder is not dissolved in the plating solution, and the plated film may be firmly bound to the base material. Further, a uniform line width implemented on a precursor pattern may be directly transferred to a wiring pattern after plating.

A plating rate in electroless plating depends on the temperature of a plating solution. Specifically, the plating rate may be increased exponentially in proportion to the plating temperature. Therefore, the plating method using the catalyst ink for plating of the present invention enables plating at a high temperature, so that the growth rate of the plated film may be significantly improved.

Experimental Example 1: Preparation of Ink for Plating

Ink was prepared by sequentially dissolving 10 g/L of silver nitrate (Daejung Chemicals & Metals Co., Ltd.), 10 g/L of 3-aminopropyltriethoxysilane (Sigma-Aldrich), and 180 g/L of hydroxypropyl cellulose (Sigma-Aldrich) in water at room temperature. For comparison with the present invention, an ink to which HPC was not added (hereinafter, referred to as 'Excluding HPC') was also prepared.

The viscosity of the catalyst ink for plating was measured with a cone-and-plate rheometer (MCR102, Anton Paar) in a shear rate range of $10^1$ to $10^4$ s$^{-1}$. In order to obtain a storage elastic modulus and a loss elastic modulus by the function of stress, the stress was continuously changed at a constant frequency of 1 Hz.

Figure 5A:
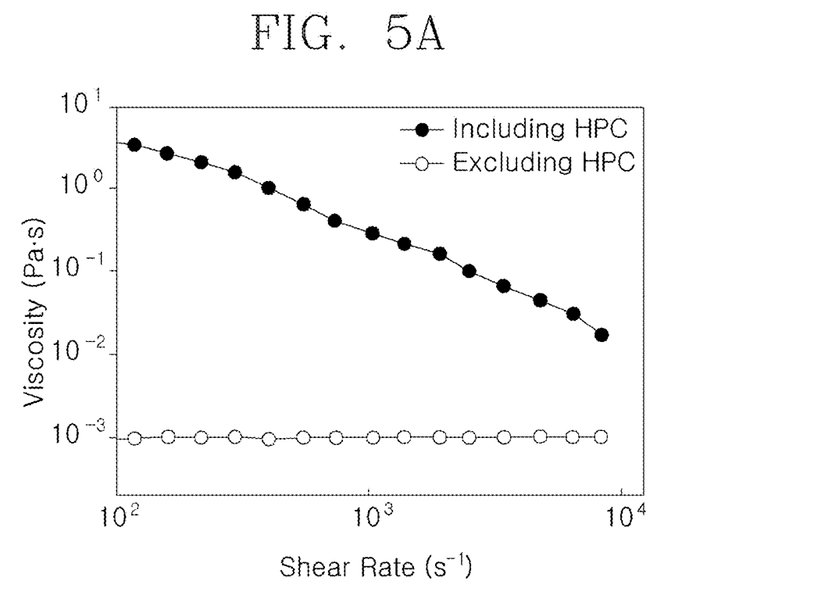
FIGS. 5A and 5B are graphs illustrating the flow characteristics of a catalyst ink for plating prepared according to an example of the present invention.
Figure 5B:
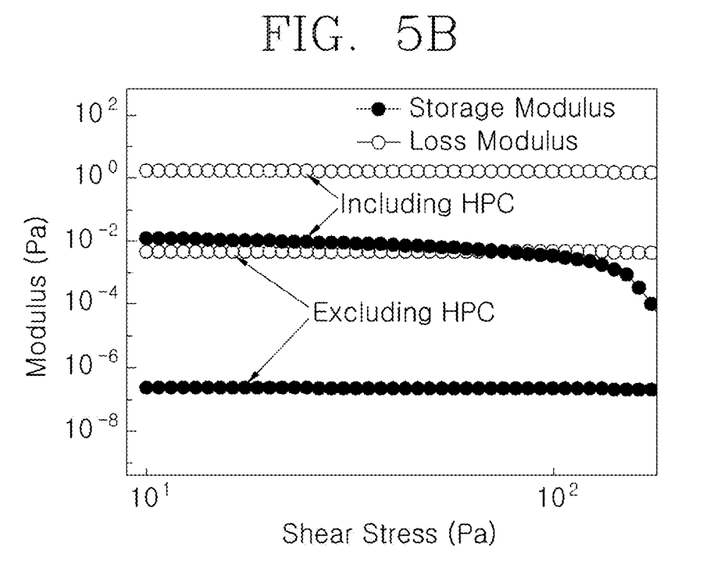

FIGS. 5A and 5B are a graph illustrating the flow characteristics of a prepared catalyst ink for plating. As can be seen in FIG. 5A, an ink to which the HPC is not added shows a Newtonian fluid behavior in which the viscosity is not changed depending on the shear rate, but an HPC-added ink shows a shear thinning phenomenon in which the viscosity is decreased depending on the shear rate.

Meanwhile, as illustrated in FIG. 5B, the modulus value of the ink to which the HPC is not added is kept constant in the shear stress interval. In contrast, in the case of the HPC-added ink, the ink shows a behavior in which the storage modulus value is decreased while the shear stress is increased, and a relationship of loss modulus >storage modulus in all shear stress intervals is maintained. This is called a liquid-like behavior. Meanwhile, in the case of the ink to which the HPC is not added, the loss modulus/storage modulus ratio is >$10^4$ or more, but in the case of the HPC-added ink, this ratio is decreased, but shows $10^2$ or more in the illustrated stress interval, and it can be seen that the difference is reduced in a region where the shear stress is high.

Experimental Example 2: Manufacture of Precursor Pattern

From the ink prepared in Experimental Example 1, a two-dimensional line pattern having a line width of 10 μm and repeatedly continuous in the horizontal and vertical directions was formed on a polyimide (PI) base material using a glass micronozzle with a nozzle tip opening diameter of 10 μm and a P-97 nozzle puller manufactured by Sutter Instrument Company. In this case, the ink was released from the tip of the nozzle through a meniscus produced by the surface tension. The manufactured precursor pattern was annealed by air at a temperature of 70° C. The manufactured precursor pattern was observed with S-4800 FE-SEM manufactured by Hitachi High-Technologies Corporation.

Experimental Example 3: Electroless Plating

The precursor pattern manufactured in Experimental Example 1 was immersed in a Cu electroless plating solution (6.78 g/L copper (II) sulfate pentahydrate (Daejung Chemicals & Metals Co., Ltd.), 20.04 g/L potassium hydrogen tartrate (Daejung Chemicals & Metals Co., Ltd.), and 8 g/L sodium hydroxide (Daejung Chemicals & Metals Co., Ltd.)) maintained at a temperature of about 60° C. for 1 to 50 minutes and plated. The manufactured plated pattern was observed with S-4800 FE-SEM manufactured by Hitachi High-Technologies Corporation. In addition, the electrical conductivity was measured by a two-point probe method using a Keithley 2612A device at room temperature.

Figure 6:
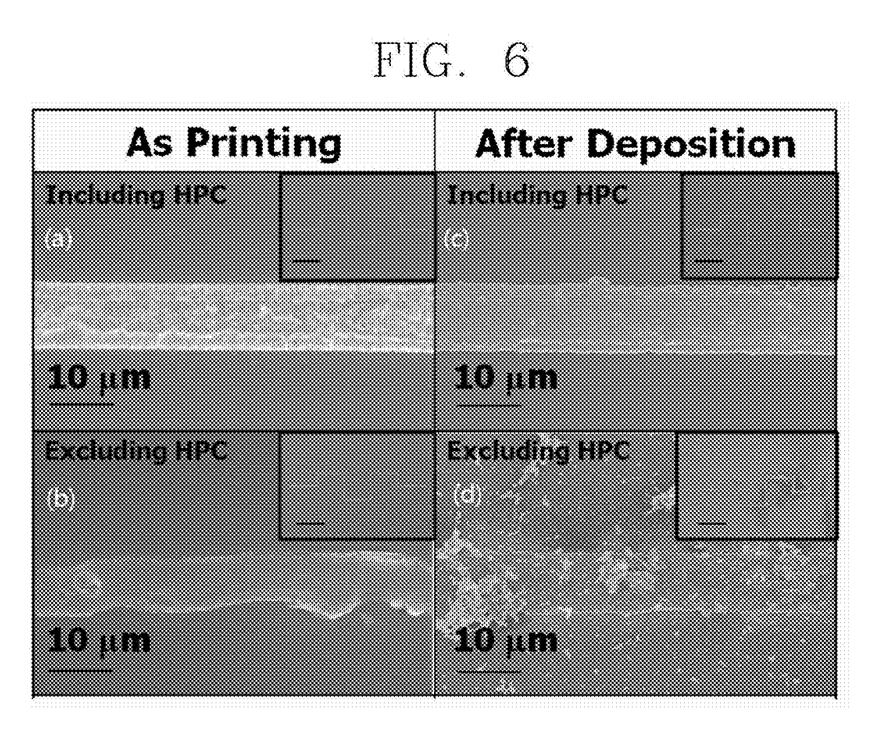
FIG. 6 is a plan photograph of a sample in which the precursor pattern manufactured according to an experimental example of the present invention is immersed in a plating solution and plated.

FIG. 6 is a plan photograph of a sample in which the precursor pattern manufactured according to the experimental example is immersed in a plating solution for 20 minutes and plated.

FIGS. 6(A) and 6(B) are a plan photograph of a pattern (Including HPC) manufactured with the ink of the example of the present invention and a pattern (Excluding HPC) manufactured with the ink in the comparative example, respectively, and FIGS. 6(C) and 6(D) are plan photographs of the pattern after being plated. In the photographs FIGS. 6(A) to 6(D), the inside of the small box on the right side shows the overall pattern at low magnification.

First, as illustrated in FIGS. 6(A) and 6(C), it can be seen that a uniform line width can be implemented in the precursor pattern manufactured with the HPC-added ink, and the uniformity of the line width and the line width is almost maintained even after plating.

However, as illustrated in FIGS. 6(B) and (D), it can be confirmed that the precursor pattern manufactured with the ink to which the HPC is not added has a non-uniform line width, and an untidy plated film is formed after plating. This is a result of pattern decomposition at 60° C. during the electroless plating process when the HPC is not added.

FIGS. 7(A) to 7(D) are electron microscope photographs illustrating the morphology of the plated film formed over the plating time of the pattern (Including HPC) manufactured with the ink of the example of the present invention.

Figure 7:
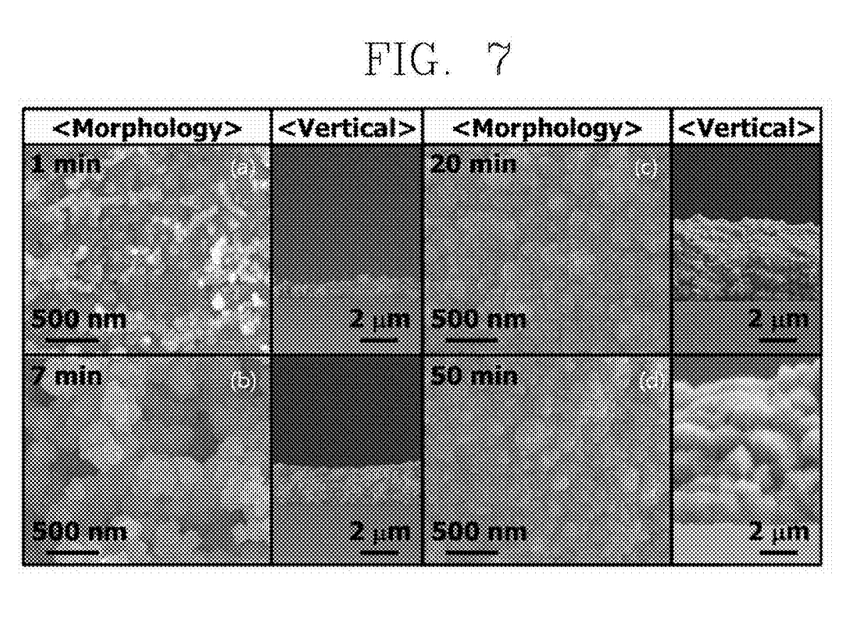
FIG. 7 is a set of electron microscope photographs illustrating the morphology of the plated film of a pattern manufactured according to the examples of the present invention over the plating time.

From FIG. 7, it can be seen that as the plating time is increased, the particle size is increased and the thickness of the plated film is also increased.

Figure 8:
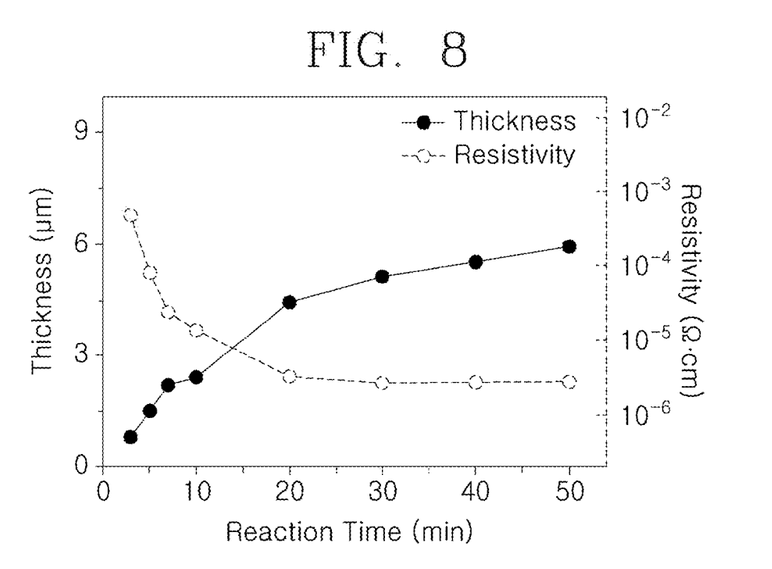
FIG. 8 is a graph showing the results of measuring the resistance value of the plated pattern of the pattern manufactured according to the examples of the present invention over the plating time.

FIG. 8 is a graph showing the results of measuring the resistance value of the plated pattern over the plating time (reaction time).

Referring to FIG. 8, it can be seen that when the plating time is 20 minutes or more, the electrical characteristics are kept almost constant. Meanwhile, it can be seen that when the plated pattern is plated for 50 minutes, the resistance of the plated film is only about 1.53 times the resistivity of bulk Cu, and a plated film with high conductivity can be obtained.

Experimental Example 4: Evaluation of Adhesive Strength

As in Experimental Example 3, Cu plating was performed between two terminals of a plastic board for 20 minutes to form a plated pattern, thereby electrically connecting the two terminals. After an adhesive tape was attached to a plated pattern forming portion, it was confirmed whether or not the plated pattern was peeled off when the adhesive tape was removed.

Figure 9:
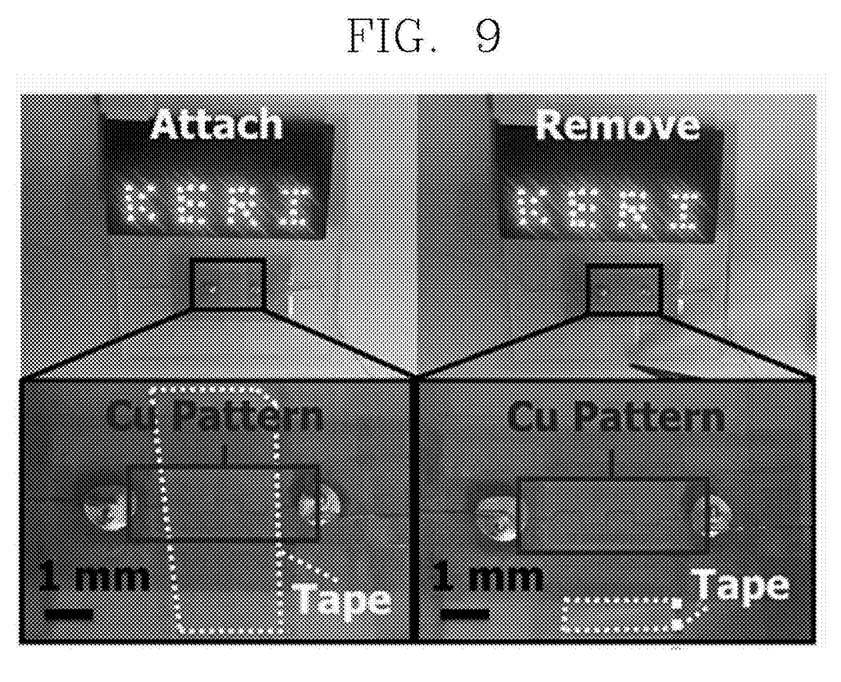
FIG. 9 is a set of photographs taken before and after the evaluation of the adhesive strength of the pattern manufactured according to the examples of the present invention.

FIG. 9 is a set of photographs taken after the adhesive tape was attached and after the adhesive tape was removed. As illustrated, it can be seen that there was no disconnection before and after the adhesive tape was attached.

Although the present invention has been described in detail through the examples of the present invention, the above description exemplifies the present invention, and the present invention is not limited thereto. It should be considered to belong to the scope of the present invention to the extent that various modifications can be made by any person having ordinary skill in the art to which the invention pertains without departing from the appended claims and the gist of the invention.

INDUSTRIAL APPLICABILITY

The present invention can be used in printed electronics which implement electronic devices, electronic components, printed circuit boards, and the like.

The invention claimed is:

1. A method for plating, comprising:
applying a catalyst ink to a substrate to form a precursor pattern; and
forming a plated pattern by immersing the substrate in which the precursor pattern is formed in a plating solution which is maintained at a temperature equal to or higher than a lower critical solution temperature in a temperature-composition phase diagram for a solvent-polymer binary system for electroless plating,
wherein, the catalyst ink comprising:
a polymer binder;
a metal ion as a catalyst;
a coupling agent for coupling the metal ion and the polymer; and
a solvent,
wherein the polymer has the lower critical solution temperature in the temperature-composition phase diagram for the solvent-polymer binary system,
wherein the lower critical solution temperature is 55° C. or higher.

2. The method of claim 1, wherein the lower critical solution temperature is 60° C. or higher.

3. The method of claim 1, wherein the lower critical solution temperature is 65° C. or higher.

4. The method of claim 1, wherein the solvent is water, alcohol, or acetone.

5. The method of claim 1, wherein the metal of the metal ion is at least one selected from the group consisting of Ag, Fe, Co, Ni, Cu, Pd, Pt, Sn, and Au.

6. The method of claim 1, wherein the ink has a viscosity of 5 mPa·s to 1,500 mPa·s.

7. A method for plating, comprising:
applying a catalyst ink to a substrate to form a precursor pattern; and
forming a plated pattern by immersing the substrate in which the precursor pattern is formed in a plating solution which is maintained at a temperature equal to or higher than a lower critical solution temperature in a temperature-composition phase diagram for a solvent-polymer binary system for electroless plating,
wherein, the catalyst ink comprising:
a polymer binder;
a metal ion as a catalyst;
a coupling agent for coupling the metal ion and the polymer; and
a solvent,
wherein the polymer has the lower critical solution temperature in the temperature-composition phase diagram for the solvent-polymer binary system,
wherein the lower critical solution temperature is 50° C. or higher, and
wherein the polymer comprises an OH functional group.

8. A method for plating, comprising:
applying a catalyst ink to a substrate to form a precursor pattern; and
forming a plated pattern by immersing the substrate in which the precursor pattern is formed in a plating solution which is maintained at a temperature equal to or higher than a lower critical solution temperature in a temperature-composition phase diagram for a solvent-polymer binary system for electroless plating,
wherein, the catalyst ink comprising:
a polymer binder;
a metal ion as a catalyst;
a coupling agent for coupling the metal ion and the polymer; and
a solvent,
wherein the polymer has the lower critical solution temperature in the temperature-composition phase diagram for the solvent-polymer binary system,
wherein the lower critical solution temperature is 50° C. or higher, and
wherein the polymer comprises at least one selected from the group consisting of hydroxypropyl cellulose, methyl cellulose, hydroxypropylmethyl cellulose, ethyl (hydroxyethyl)cellulose, poly(N-isopropylacrylamide-co-acrylic acid) and poly(propylene glycol).

* * * * *